(12) United States Patent
Khan

(10) Patent No.: US 12,517,960 B1
(45) Date of Patent: Jan. 6, 2026

(54) INTEGRATED CONDITIONING AND MACHINE-LEARNING MODEL FOR NATURAL LANGUAGE PROCESSING

(71) Applicant: Bank of America Corporation, Charlotte, NC (US)

(72) Inventor: Aftab Khan, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/956,217

(22) Filed: Nov. 22, 2024

(51) Int. Cl.
*G06F 16/93* (2019.01)
*G06F 18/241* (2023.01)
*G06N 3/084* (2023.01)

(52) U.S. Cl.
CPC ............ *G06F 16/93* (2019.01); *G06F 18/241* (2023.01); *G06N 3/084* (2013.01)

(58) Field of Classification Search
CPC ........ G06F 16/93; G06F 18/241; G06N 3/084
See application file for complete search history.

(56) References Cited

U.S. PATENT DOCUMENTS

| | | | |
|---|---|---|---|
| 11,625,544 B2 | 4/2023 | Calapodescu et al. | |
| 11,886,815 B2 | 1/2024 | Gu et al. | |
| 11,893,385 B2 | 2/2024 | Balasubramanian et al. | |
| 11,907,306 B2* | 2/2024 | Attar | G06V 30/18 |
| 11,935,316 B1* | 3/2024 | Rangarajan | G06V 10/82 |
| 12,002,276 B2* | 6/2024 | Kelly | G06F 16/355 |
| 12,008,330 B2 | 6/2024 | Kang et al. | |
| 12,046,011 B2* | 7/2024 | Kaza | G06V 10/774 |
| 2016/0055375 A1* | 2/2016 | Neavin | H04N 1/00 382/218 |
| 2018/0373711 A1* | 12/2018 | Ghatage | G06V 30/412 |
| 2020/0394396 A1* | 12/2020 | Yanamandra | G06V 30/413 |
| 2022/0067107 A1 | 3/2022 | Overlund et al. | |
| 2022/0092097 A1 | 3/2022 | Gupta | |
| 2022/0100954 A1* | 3/2022 | Sakamoto | G06F 16/176 |
| 2022/0179906 A1 | 6/2022 | Desai et al. | |
| 2022/0237230 A1* | 7/2022 | Zovic | G06N 3/045 |
| 2022/0237398 A1* | 7/2022 | Asermely | G06F 3/0483 |
| 2022/0245357 A1 | 8/2022 | Oddy | |
| 2022/0292258 A1 | 9/2022 | Zeng et al. | |
| 2022/0414489 A1* | 12/2022 | Cahn | G06N 5/022 |
| 2023/0081042 A1 | 3/2023 | Bong-Kyu et al. | |
| 2023/0125977 A1 | 4/2023 | Lee et al. | |
| 2024/0054281 A1 | 2/2024 | Bensoussan et al. | |
| 2024/0248897 A1 | 7/2024 | Nahamoo et al. | |
| 2024/0289550 A1 | 8/2024 | Wu | |
| 2024/0370517 A1 | 11/2024 | Luke et al. | |

* cited by examiner

*Primary Examiner* — Hau H Hoang

(57) ABSTRACT

The system includes a memory to store an electronic compilation document with multiple pages and operational instructions, as well as a processor to execute these instructions. It uses a first machine-learning classifier, trained on labeled pages, to identify document types within the electronic compilation document. After identifying document types, the system performs a preprocessing action on each page of the electronic compilation document, creating a preprocessed document. Additionally, the system uses a second machine-learning classifier, trained with labeled data specifying both document type and page position (first or last page), to classify each page according to its type and position, indicating whether it is the first or last page within that document type. Further, the system organizes pages by document type, grouping them sequentially from the first to the last page of each type.

20 Claims, 6 Drawing Sheets

INTEGRATED CONDITIONING AND MACHINE-LEARNING MODEL FOR NATURAL LANGUAGE PROCESSING

TECHNICAL FELD

The present disclosure relates generally to the use of an integrated conditioning and deep learning model for natural language processing.

BACKGROUND

In document processing systems, managing large volumes of incoming document batches that contain multiple document types presents challenges. These batches, often contain pages from various sources, and may need to be accurately classified and segmented into distinct, structured documents for downstream processing. Traditional methods for document classification and segmentation have frequently relied on manual sorting or rule-based systems, which are prone to inefficiencies and inaccuracies, particularly when handling diverse document formats.

SUMMARY

Conventional document processing systems, such as those based on rule-based models, typically rely on hard-coded rules to identify document types and boundaries. These rigid systems often struggle with layout or structural variations, leading to frequent misclassifications, including both false positives and negatives. For example, even minor layout changes or OCR errors can disrupt these models, causing classification failures and making them challenging to maintain in diverse document environments. While more recent approaches leverage machine-learning models (MLMs) to address some of these limitations, these MLMs demand extensive training time and large datasets for each document type, significantly increasing the resources required for model adaptation. This reliance on massive, labeled data slows down deployment, especially in real-world settings where document types and formats vary frequently. Accordingly, there is a need for a system that can accurately classify and segment mixed document batches and identify document boundaries without relying on manual intervention. The present disclosure describes such a system and corresponding methods for classifying and segmenting mixed document batches.

System Application

An effective system can make a substantial impact for libraries, legal offices, and government agencies. Such a system can classify and segment large batches of documents, automate storage, and reduce manual sorting, saving time and improving classification and segmentation accuracy.

In certain industries, where processing documents requires organizing and extracting data from multipage documents, this system can distinguish between sections of a claim, identify page groupings, and separate documents for downstream processing steps.

In clinical settings, where patient records often comprise complex, multipage documents with details such as patient histories, diagnostic summaries, and treatment orders, this system can efficiently categorize and segment these documents. By automatically organizing records, it enhances data flow, making information more accessible for practitioners and reducing the manual workload involved in sorting and managing patient information.

Technical Improvements Over Conventional Systems

The disclosed system employs machine-learning classifiers and a conditioning model to improve document classification and segmentation accuracy while also minimizing the training time typically required for such systems. When the machine-learning classifier is a foundational natural language processing model, the system may function effectively with the model's initial training, potentially eliminating the need for additional training. This system can use an integrated model architecture that includes several cooperating models to classify pages of an electronic document compilation with high accuracy, even without extensive retraining.

Page classification is improved by first applying preprocessing to each page in the document compilation. Unlike conventional systems, this disclosure describes a system that improves the performance of machine-learning classifiers by focusing on specific segments of each page before classification, by retaining only relevant portions to streamline the process. This targeted preprocessing helps the classifier more accurately identify first and last pages, addressing a primary challenge in document boundary detection. By isolating and removing irrelevant content on each page, the system minimizes noise, improving classifier accuracy for page boundary identification and boosting first-page and last-page detection rates.

Moreover, the system's preprocessing actions are dynamically tailored using historical performance data, allowing the conditioning model to adjust such preprocessing actions based on specific document types. This adaptability increases classification precision and enables the system to handle varied document formats effectively. Traditional setups generally lack preprocessing or rely on static rules, but here, preprocessing actions can self-adjust, reducing the need for manual oversight and adapting to document variations.

Beyond preprocessing, the system performs an initial analysis of the electronic document compilation to identify the types of documents within it. Based on the detected document types, appropriate preprocessing actions are applied for improved classification.

The system further integrates the preprocessing and classification models into a unified machine-learning framework, in some instances, forming a single machine-learning neural network capable of end-to-end training. For such cases, the integrated approach allows backpropagation through both models, improving the model's weights and improving accuracy for classifying each page by document type and page position (e.g., first or last page). Unlike traditional systems, which use separate models or rule-based methods that result in lower accuracy and higher error rates for complex sequences, the integrated model provides superior accuracy with reduced training demands.

Technical Improvements—Data Transformation

The integrated model in this system advances beyond simple data analysis by incorporating a conditioning model that applies targeted preprocessing actions, often guided by insights from a trained machine-learning model. This transformation process is more than an abstract handling of data; it represents a technological enhancement by transforming a document into a new intermediate form before classification. By embedding preprocessing within the workflow, the system achieves a clear technical advantage by reducing noise in the documents and focusing on the most relevant data. This improvement significantly boosts the classifier's capacity to segment and categorize documents accurately, delivering more reliable and precise results across diverse document types.

Examples of Technical Improvements Over Conventional Systems

Example 1: In a conventional system, attempting to classify a multi-page document based on full-page data often results in accuracy rates as low as 60%, especially in complex documents where page layouts are inconsistent. By implementing the disclosure's approach of selectively using only the top and bottom text lines, accuracy improves to over 90%. This change enhances the classifier's focus, reducing processing requirements and improving reliability across varied document types.

Example 2: Conventional systems lack the capability to adjust preprocessing actions dynamically, requiring manual updates when new document types are introduced. In contrast, this system can use a preprocessing model that leverages historical performance data, automatically selecting the suitable preprocessing steps for each document type. This automation ensures that the system maintains high classification accuracy across different document formats without manual intervention.

By addressing the drawbacks of conventional systems through specific technical improvements, this system represents an advancement in document processing, enabling scalable, precise, and adaptable automation across diverse document types and formats.

System Embodiments

In some embodiments, a system discussed herein includes a memory configured to store an electronic compilation document containing multiple pages and operational instructions. Further, the system includes a processor operably coupled to the memory, the processor configured to execute the operational instructions. The processor is configured to identify one or more document types within the electronic compilation document using a first machine-learning classifier, the first machine-learning classifier being a first subset of the operational instructions, wherein the first machine-learning classifier is trained on training data comprising pages, each labeled by a corresponding document type. In response to identifying the one or more document types, the processor is configured to implement a preprocessing action to each page of the electronic compilation document, resulting in a preprocessed electronic compilation document. Also, the processor is configured to classify each page of the preprocessed electronic compilation document using a second machine-learning classifier, the second machine-learning classifier being a second subset of operational instructions, by identifying each page as a specific document type, a first page of the specific document type, and a last page of the specific document type, wherein the second machine-learning classifier is trained on labeled document data specifying document type and a page position for each page of the labeled document data, the page position indicating whether each page is the first page. Further, the processor is configured to group pages of the electronic compilation document according to the specific document type, with each group comprising pages from the first page to the last page of the specific document type.

In some embodiments, the preprocessing action includes selecting a first specified number of top lines from each page of the electronic compilation document and selecting a second specified number of bottom lines from each page of the electronic compilation document. The selected top lines and bottom lines from each page are combined to form a corresponding preprocessed page in the preprocessed electronic compilation document.

In some embodiments, for the one or more document types, the preprocessing action is selected from a set of template preprocessing actions, the set being determined based on historical performance data indicating effectiveness of each template preprocessing action from the set of template preprocessing actions in producing the preprocessed electronic compilation document in which pages are classified by the second machine-learning classifier for the one or more document types with an accuracy above an accuracy threshold.

In some embodiments, each document type from the one or more document types, the preprocessing action is selected from a set of template preprocessing actions based on historical performance data indicating effectiveness of each template preprocessing action from the set in producing the preprocessed electronic compilation document in which pages can be classified by the second machine-learning classifier with an accuracy above an accuracy threshold.

In some embodiments, the preprocessing action is implemented using a preprocessing machine-learning model, the preprocessing machine-learning model comprising a third subset of the operational instructions, wherein the implementation of the preprocessing action to each page of the electronic compilation document comprises performing an inference using the preprocessing machine-learning model on each page, resulting in a corresponding page of the preprocessed electronic compilation document.

In some embodiments, the preprocessing machine-learning model and the second machine-learning classifier each comprise neural network models with associated weights, the training of the preprocessing machine-learning model and the second machine-learning classifier comprising performing backpropagation to adjust the associated weights, thereby reducing an error between a predicted classification for each page of the electronic compilation document and labeled data indicating a classification for each page, the classification for each page comprising identification of the document type and whether each page is the first page.

In some embodiments, the preprocessing action is performed by the second machine-learning classifier having as an input a first prompt, and wherein the classifying of each page of the preprocessed electronic compilation document is determined by the second machine-learning classifier having as the input a second prompt.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Various embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" can also be used herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

System Overview

Figure 1:
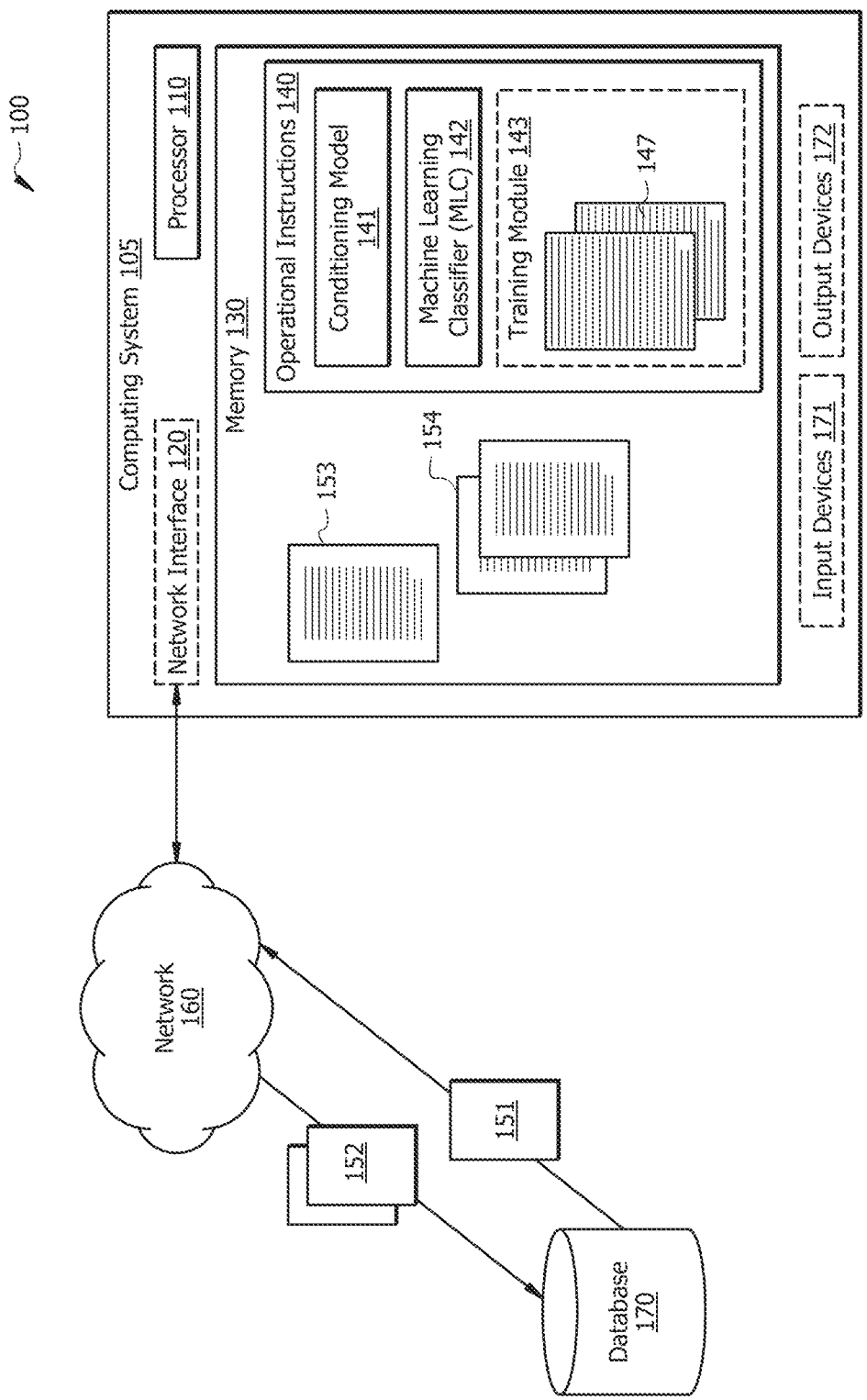
FIG. 1 illustrates a system for processing and classifying documents, according to an embodiment.

FIG. 1 illustrates an embodiment of a system 100 that is configured to classify pages and, in some cases, parts of electronic documents as belonging to a particular electronic document type. In some embodiments, system 100 comprises a computing system 105, which can optionally be communicatively coupled with a database 170 via a network 160. In some embodiments, database 170 can be configured to store various electronic documents 151, transmit these documents to computing system 105, and receive processed electronic documents 152 from computing system 105 for storage. Further, in some embodiments, database 170 may store additional data that may be used by computing system 105. For example, database 170 can be configured to store training data for training various machine-learning models of computing system 105, as further described below, updates to various machine-learning models of computing system 105, and the like. In some embodiments, system 100 may not have all of the components listed and/or may have other elements instead of, or in addition to, those listed above. For example, in some cases, database 170 may not be present, and computing system 105 may receive electronic documents using other means (e.g., via an input interface, as further described below).

Computing system 105 is configured to process electronic documents composed of multiple pages, herein referred to as electronic compilation documents. These compilation documents often consist of various concatenated documents, each potentially of a different type. For example, an electronic compilation document may start with pages from a first document of a specific type (e.g., a system manual), followed by pages from a second document of another type (e.g., a process description), and continue with pages from a third document of yet another type (e.g., a product description). Generally, each document within the electronic compilation is continuous and follows directly after the preceding one without interruption.

System Components

Network

Network 160 may be any suitable type of wireless and/or wired network. Network 160 may be connected to the Internet or public network. Network 160 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. Network 160 may include fiber optics, optical fibers, and the like to implement quantum communication channels. Network 160 may be configured to support any suitable type of communication protocol as would be appreciated by one of ordinary skill in the art.

Database

Database 170 can be a scalable storage architecture designed to support a range of data management needs within system 100. Its structure can include various configurations, such as network-attached storage (NAS), cloud storage, storage area networks (SANs), Relational Databases, data warehouses, or any other type of storage that may be directly or indirectly connected to components of system 100. In addition to storing electronic compilation documents 151 and processed electronic documents 152, database 170 may also store software updates for computing system 105. These updates could include modifications to operational instructions or patches that improve system functionality. When computing system 105 utilizes machine-learning models (as described further below), database 170 may also store updated models, provided either by an external training system (not shown in FIG. 1) or by a training module within computing system 105, as described below, designed to enhance these models. This approach ensures that the machine-learning models within computing system 105 stay updated, allowing them to continuously adapt to new data patterns detected in incoming documents.

In some cases, database 170 is designed to receive electronic compilation documents 151 from other devices communicated via network 160 (not shown in FIG. 1). These external devices could include various servers, client systems, and data repositories distributed across different locations, enabling the aggregation of documents from diverse sources. Such implementation allows database 170 to serve as a centralized storage point for compilation documents, which may then be processed, indexed, or further distributed across various components of system 100 as needed.

Computing System

Computing system 105 is a hardware computer system configured to classify and process pages of electronic compilation documents. In certain embodiments, computing system 105 may be implemented by a cluster of computing devices, such as virtual machines. For example, computing system 105 may be implemented by a plurality of computing devices using distributed computing and/or cloud computing systems in a network. In certain embodiments, computing system 105 may be configured to provide services and resources (e.g., data and/or hardware resources as described herein, etc.) to other components and devices.

Computing system 105 may comprise a processor 110 operably coupled with a network interface 120 and a memory 130. Further, computing system 105 may optionally include one or more input devices 171 and one or more output devices 172.

Processor

Processor 110 of computing system 105 can comprise one or more processors. Processor 110 can be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. Processor 110 may be a programmable logic device, a microcontroller, a microprocessor, or any suitable number and combination of the preceding. The one or more processors are configured to process data and may be implemented in hardware or software. For example, processor 110 may be 8-bit, 16-bit, 32-bit, 64-bit, or of any other suitable architecture. Processor 110 may include an arithmetic logic unit (ALU) for performing arithmetic and logic operations. Processor 110 may register the supply operands to the ALU and store the results of ALU operations. Processor 110 may further include a control unit that fetches instructions from memory and executes them by directing the coordinated operations of the ALU, registers, and other components. The one or more processors are configured to implement various software instructions. For example, the one or more processors are configured to execute operational instructions 140 to perform various operations of computing system 105 described herein. In this way, processor 110 may be a special-purpose computer designed to implement the functions disclosed herein. The processor 110 is configured to operate as described in FIGS. 2-3 and 5-6. For example, the processor 110 may be configured to perform one or more operations of method 600 as described in FIG. 6.

Network Interface

Network interface 120 of computing system 105 is configured to enable wired and/or wireless communications. It should be noted, that in some cases, the network interface 120 is optional and data to and from computing system 105 may be transmitted via other means (e.g., via input devices 171 and output devices 172).

Network interface 120 may be configured to communicate data between computing system 105 and other components of system 100. For instance, network interface 120 may be used to communicate data between computing system 105 and database 170 via network 160. Network interface 120 may comprise a near-field communication (NFC) interface, a Bluetooth interface, a Zigbee interface, a Z-Wave interface, a radio-frequency identification (RFID) interface, a wireless fidelity (Wi-Fi) interface, a local area network (LAN) interface, a wide area network (WAN) interface, a metropolitan area network (MAN) interface, a personal area network (PAN) interface, a wireless personal area network (WPAN) interface, a modem, a switch, and/or a router. Network interface 120 may be configured to use any suitable type of communication protocol.

Memory

Memory 130 of computing system 105 may be a non-transitory computer-readable medium capable of storing data and instructions. It may be configured as either volatile or non-volatile memory and could include types such as read-only memory (ROM), random-access memory (RAM), ternary content-addressable memory (TCAM), dynamic random-access memory (DRAM), or static random-access memory (SRAM). Additionally, memory 130 may encompass various storage solutions, such as a local database, a cloud-based database, or network-attached storage (NAS), providing flexibility in data storage options.

The memory can be comprised of one or more storage components, such as disks, tape drives, or solid-state drives, and may serve multiple purposes, including overflow data storage, storing programs selected for execution, and retaining instructions and data accessed during program operation. Memory 130 can store any information referenced in FIGS. 1-6, along with additional data, operational instructions, logic, rules, or code necessary to execute the described functions when accessed by processor 110.

Memory 130 stores operational instructions 140, along with electronic compilation document 153 and classified electronic documents 154, to support various processing tasks within computing system 105. Operational instructions 140 include computational models designed for document classification and processing, such as an optional conditioning model 141 and a machine-learning classifier 142. In certain cases, conditioning model 141 may be omitted, allowing the machine-learning classifier 142 to handle the preprocessing tasks as needed.

Electronic Compilation Document

Electronic compilation document 153 stored in memory 130 can be any suitable digital file that combines multiple individual documents of different types into one continuous structure. These documents can originate from various formats, including PDF, Word, Excel, and image files, among others, allowing for a wide range of document storage and presentation options. Each document within this compilation has a distinct beginning and end, ensuring that it flows without interruptions from other documents, thereby preserving its original continuity and structure.

Various documents contained within electronic compilation document 153 may include diverse formatting elements, such as specialized sections, custom fonts, headers, footers, side margins, embedded images, tables, and charts. These elements can be used for each document within electronic compilation document 153 to maintain its specific visual and organizational requirements within the overall compilation.

For documents originally available only on paper, Optical Character Recognition (OCR) technology can be applied to convert them into editable and searchable electronic formats, which then can be combined to form electronic compilation document 153. OCR technology is configured to interpret characters, fonts, and layout elements within scanned images or documents, allowing them to be digitally processed. Various OCR methods may be used depending on the document's complexity and the desired level of accuracy. Template-based OCR relies on predefined layouts for documents with standardized fields, while pattern matching and feature extraction OCR offers more flexibility, accommodating a wider range of fonts and symbols. Machine-learning-based OCR methods can also be used, utilizing trained algorithms that adapt to different layouts, fonts, and even handwriting for greater versatility and accuracy. Various OCR models can be a part of conditioning model 141, as further described below.

During the OCR process, a confidence level can be calculated for each recognized element, representing the reliability of character or word recognition in the document.

Higher confidence levels suggest a more accurate recognition process, while lower confidence levels may indicate areas needing manual verification. This confidence scoring ensures that the compiled electronic document is both accurate and reliable for further use within the compilation.

In various embodiments, electronic compilation document 153 integrates multiple formatted documents, regardless of whether they were digitally created or OCR-processed from paper, into a single, unbroken file. This structure maintains the continuity of each individual document, with consistent formatting and the option for OCR-based digitization when necessary.

Classified Electronic Documents

Classified electronic documents 154 (herein also referred to as processed electronic documents 154) represent a collection of individual documents extracted from (or identified within) the electronic compilation document 153. This extraction process involves identifying the first and last pages of each document within the compilation, as well as its associated document type. In some implementations, each document can then be separated from electronic compilation document 153 and stored individually as part of classified electronic documents 154. For example, if electronic compilation document 153 contains a manual for a particular system (first document type) followed by historical usage data for the system (second document type), classified electronic documents 154 are configured to detect the start and end pages of each document and categorize them by type. After separation, classified electronic documents 154 can be stored as individual files and may be transmitted as distinct electronic documents 152, which can then be archived in database 170. In some cases, however, the separation process is bypassed, and only the first and last pages of each document type, along with the document type itself, are identified without full extraction. Subsequently, this information, which labels each page by its document type and page position (e.g., identifying whether it is a first page, last page, or an intermediate page), can be stored with electronic compilation document 153, enabling individual documents to be readily extracted from electronic compilation document 153 upon request.

Input Devices

One or more input devices 171 may include a scanner, display, keyboard, mouse, or dongle, enabling the input of electronic compilation document 153 into the system. For instance, a scanner can digitize physical documents, converting them into electronic compilation document 153 ready for system processing. A mouse or touchscreen display allows users to navigate and select files from external drives or servers, while a dongle or USB device facilitates rapid file transfer from external storage into memory 130 of computing system 105. These input devices 171, either individually or in combination, provide a flexible means for inputting electronic compilation documents, preparing them for further processing and classification.

Output Devices

Once classified, the electronic documents can be output through one or more output devices 172. In some cases, one or more output devices 172 can be used to facilitate user review. For example, when one or more output devices include a monitor or a display screen, such devices can allow users to visually inspect the classified documents, verifying the separation and categorization for accuracy. Further, the feedback from the users can be used to update various models of computing system 105 via training module 143 having training data 147, as further described below.

Conditioning Model

In various embodiments, conditioning model 141 may be configured to transform electronic compilation document 153 into an intermediate document that can be more readily classified by machine-learning classifier 142. The two-stage process, which involves first transforming the electronic compilation document into an intermediate format and then classifying the intermediate document, provides a significant improvement over previous approaches. In some cases, no electronic file copy of the intermediate document is created; instead, it is temporarily stored in memory, inaccessible to a user.

Conditioning model 141 may function as a single integrated model or consist of multiple models combined within conditioning model 141. For instance, conditioning model 141 may include a first machine-learning classifier designed specifically to identify document types within electronic compilation document 153. This classifier may employ natural language processing (NLP) techniques, trained to understand language patterns and, based on semantic structure, determine the document type. For example, if a document is an instruction manual containing details on operating a specific device, the semantic analysis by the first machine-learning classifier can accurately recognize and categorize the page as a component of the manual.

In some cases, the first machine-learning classifier is trained on a labeled dataset containing various documents, each annotated with an associated document type. These documents may include layout structures, such as column arrangement and header placement, as well as content patterns, like specific keywords or phrases. When available, metadata attributes, such as timestamps, file formats, checksums or hash values, file sizes, and authors, are also used to enhance classification accuracy. By analyzing these combined features, the first machine-learning classifier learns to distinguish between different document types. Additionally, the first machine-learning classifier may build on a foundation model initially trained to understand natural language through semantic analysis, further refined with a labeled document dataset in which each page is tagged with its corresponding document type.

In some cases, beyond analyzing the semantic content within the electronic compilation document, images can also be processed by an appropriate classifier, such as the first machine-learning classifier, to extract visual features that aid in identifying the document type. For instance, if a document includes a specific type of image, such as a technical diagram or a product photograph, the classifier can recognize these visual elements as indicators of the document type. As an example, the presence of schematic diagrams might suggest a technical manual, while product images could indicate a catalog or marketing document. By combining semantic and image analysis, the system can more accurately determine the document's classification, leveraging both textual and visual cues. Image processing techniques can be used to detect visual characteristics, such as logos, text fonts, page headers, and footers, or specific graphical layouts, further aiding in document classification.

Once the document types are identified, a preprocessing action can be applied to each page of electronic compilation document 153 to create a preprocessed intermediate document. This preprocessing action may involve either rule-based steps or machine-learning inferences to prepare the document for further processing. Rule-based actions can include predefined instructions, such as extracting specific numbers of top and bottom lines from each page. For instance, the system could be configured to select a certain number of lines from the top and bottom of each page, then combine these lines to form a preprocessed page. In an example embodiment, four top lines are extracted and four bottom lines are extracted. Alternatively, the preprocessing action may include machine-learning inferences, which dynamically determine preprocessing steps based on the content and structure of a page of a document.

Other preprocessing techniques can rely on predefined rule-based instructions that adapt to each document's specific structure. For example, header and footer content extraction can capture consistent information at the top or bottom of each page, such as section titles or page numbers, while keyword-driven paragraph selection can enable the system to search for specific terms like "Summary" or "Specifications" and extract relevant surrounding text. When structured data like tables or lists is present, the system can identify and isolate these elements. In some cases, a few rows or columns of a table can be selected or a few list items can be selected. Additionally, the system may perform section-based content extraction by recognizing standard section headings like "Introduction" or "Overview," allowing it to focus on some portions of the document. For example, a first sentence in an identified section can be selected, or a first line in the identified section can be selected. In some cases, a first line from each section can be selected. In some cases, margin content can also be selected. For documents with graphical elements, such as charts or diagrams, the system can isolate these visuals to retain only some information. These rule-based techniques are only illustrative, and any other suitable rule-based approaches can be used.

In some cases, one set of rule-based approaches may be applied to a first document type or group of document types, while a different set of rule-based approaches is used for a second document type or group of document types. For instance, if a document is identified by a first machine-learning classifier as a product manual, the rule-based approach could involve selecting the top and bottom lines of each page. In contrast, if a document is identified as a legal document, the system might extract the first sentences of each section within the document. Similarly, for the first set of documents related to product descriptions, such as manuals, advertisements, or assembly instructions, the system could be configured to extract the top four and bottom four lines of each page. For a second set of documents, such as legal documents, the rule-based approach might focus on extracting only the headers and footers. These tailored extraction techniques enable efficient content selection that aligns with the specific structure and purpose of each document type. These examples are only illustrative, and any other suitable rule-based approaches can be used.

In some cases, multiple rule-based approaches, referred to here as template preprocessing actions, may be available, with the choice of a specific preprocessing action guided by historical performance data for each document type or set of document types. This selection process ensures that the most effective preprocessing action is applied, enabling machine-learning classifier 142 to accurately identify the first and last pages of a document. For example, if a particular preprocessing action has consistently proven effective for a specific document type or group of document types, it may be selected and used when processing those documents, enhancing the accuracy of page boundary identification.

It should be noted that a rule-based approach is not the only method for determining a preprocessing action (or set of template preprocessing actions). In some cases, the set of template preprocessing actions can be identified through a machine-learning model within conditioning model 141, referred to here as the preprocessing machine-learning model. The preprocessing machine-learning model may serve as a subset of operational instructions 140. When implemented as a preprocessing machine-learning model, applying the preprocessing action to each page of the electronic compilation document involves performing inference on each page, generating a corresponding preprocessed page within the intermediate document. For instance, the preprocessing machine-learning model can take a page and its document type as inputs, producing an intermediate document that includes only selected portions of each page.

Machine-Learning Classifier (MLC)

Machine-learning classifier 142 is configured to perform several tasks: it identifies whether a page is the first page, last page, or a page in between for a specific document (herein, such page is referred to as an intermediate page), and it confirms the document type initially classified by the first machine-learning classifier. In some embodiments, machine-learning classifier 142 relies on natural language processing (NLP) techniques and operates on documents generated by conditioning model 141, ensuring that the classifier works with clean, structured input to improve accuracy in identifying page boundaries and confirming document types.

Machine-learning classifier 142, can be implemented using a Large Language Model (LLM). This LLM leverages advanced machine learning, particularly transformer-based architectures, to perform semantic analysis. Transformers, a highly effective architecture for NLP tasks, use a bi-directional attention mechanism to understand word relationships and context across a document. Unlike traditional recurrent neural networks (RNNs) that process text sequentially, transformers use a self-attention mechanism that allows the model to assess the significance of words in relation to each other, regardless of their position. This enables the LLM to capture nuanced dependencies across sentences and paragraphs, which is important for processing complex language and understanding subtle contextual cues.

The LLM can identify words within a preprocessed electronic compilation document and convert the identified words into high-dimensional vectors, known as embeddings, which capture semantic meaning and relationships between words. These embeddings place words in a continuous vector space where similar words are closer together, allowing the model to recognize semantic connections across different contexts. To retain an understanding of word order, positional encodings can be added to these embeddings, ensuring that the model can interpret word sequences effectively.

Within the transformer architecture, a multi-head attention mechanism enables the model to focus on various parts of a sentence simultaneously. Each "head" in this mechanism independently computes attention weights, allowing the model to analyze different linguistic relationships concurrently. For example, one head might focus on connections between a subject and a verb, while another might assess the relationship between an adjective and a noun. This parallel attention capability provides a comprehensive understanding of text, enhancing the LLM's ability to analyze text.

Following the attention layers, the transformer applies feed-forward neural networks to further refine the data. These networks introduce non-linearity through multiple layers of fully connected neurons, allowing the model to learn complex language patterns. Layer normalization ensures consistent input distributions across layers, stabilizing training and improving the model's performance, especially in deep architectures.

Training Module

Computing system 105 includes an optional training module 143. Training module 143 is used for training and refining conditioning model 141 and machine-learning classifier 142 by further updating the foundation models incorporated within models 141 and 142. The training process involves using training data 147, which includes labeled data specifically tailored for each model's objectives. For conditioning model 141, the labeled data includes labels identifying document types, allowing the model to better classify documents based on type. For machine-learning classifier 142, training data 147 includes the labeled data which provides information about both document types and page positions (first or last page), enabling machine-learning classifier 142 to accurately identify page boundaries and confirm document types.

During training, the module adjusts the models' internal weights through a backpropagation process. Such adjustment is driven by an error function (e.g., a mean square error, mean absolute error, cross-entropy error, and the like), which calculates the difference between the expected and predicted outcomes for each document type and page classification. By iteratively minimizing this error, training module 143 refines each model's accuracy in distinguishing document types and determining first and last pages, thereby enhancing the overall performance and reliability of the system.

Methods of Classifying Pages of Electronic Compilation Document

Figure 2:
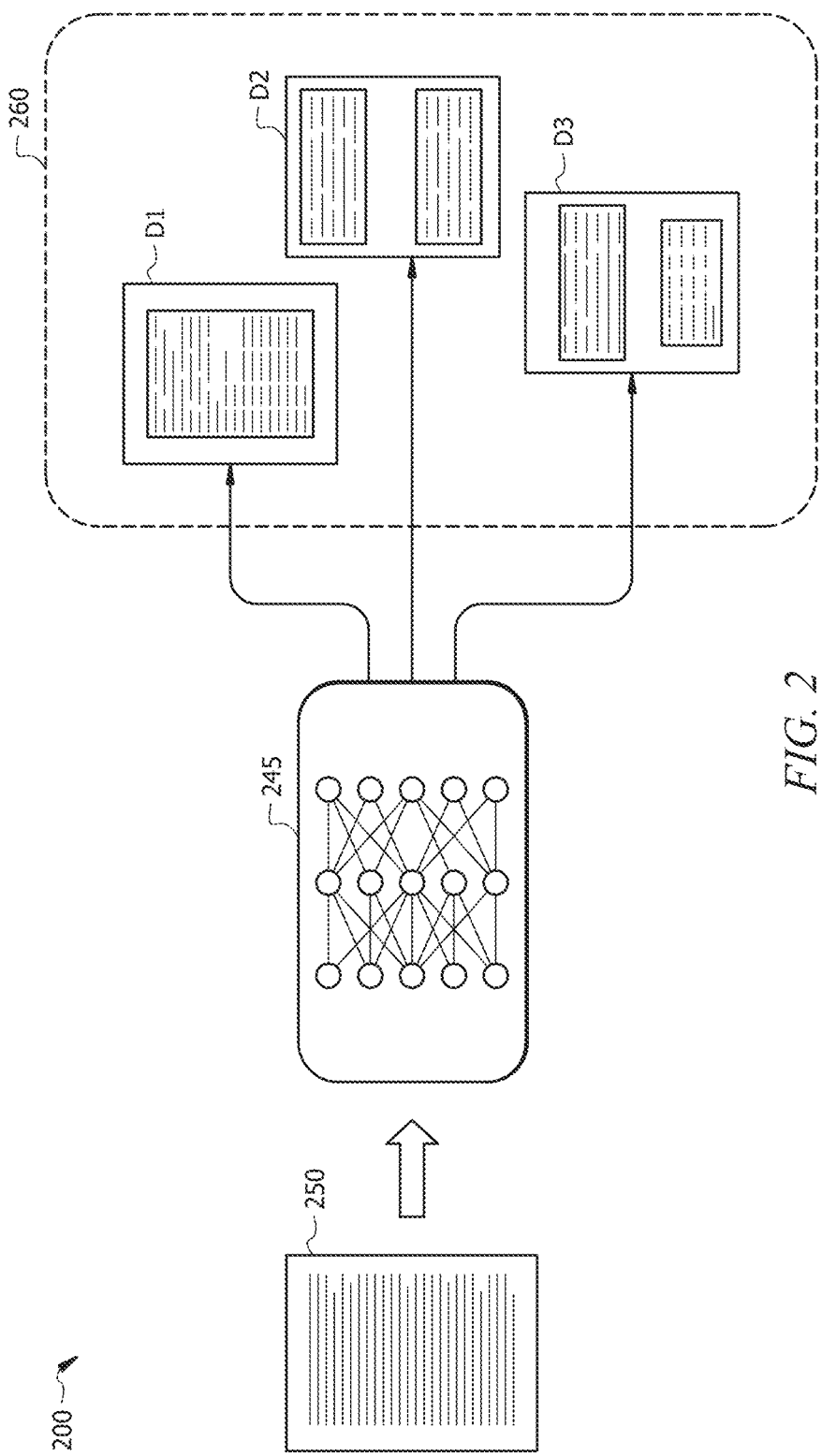
FIG. 2 is an illustrative operation of a system for processing and classifying documents, according to an embodiment.

FIG. 2 illustrates an example process 200 for transforming an electronic compilation document 250 into separate documents 260, categorized by document types D1, D2, and D3, using a machine-learning model 245. Machine-learning model 245 can combine a conditioning model (such as conditioning model 141 from FIG. 1) and a machine-learning classifier (such as classifier 142) into a unified model. In some embodiments, machine-learning model 245 can execute a script that invokes machine-learning classifier 142 with tailored prompts to generate both an intermediate, conditioned document and then a fully classified document. For instance, the script may begin by applying an initial prompt specifically designed for a particular set of document types. This prompt can be used with machine-learning classifier 142 to generate an intermediate document for further classification. Following this, the script can apply a second prompt to classify each page as either a first page, last page, or intermediate page within the document and to confirm the document type for each page.

A sample script for this process might begin by identifying document types within electronic compilation document 153. Subsequently, the script can use conditional logic to select the appropriate prompt based on the identified document types. For instance, if the document types fall within a predefined category, such as technical manuals, the script can set an initial prompt to extract only the top and bottom lines of each page, structuring the content for further analysis. The script then utilizes a while loop to process each page, applying a second prompt to classify pages as first, last, or intermediate until the entire document is processed.

In another example, the script could use conditional statements to dynamically set conditioning rules based on the document's complexity or format. For example, if the document is a complex legal contract as determined from the document format, the script might apply a rule to extract specific clauses or headings, while for simpler formatted legal documents, it could extract only the top and bottom lines to create an intermediate version for further classification. The script would then apply the selected prompt to each page, employing a while loop to ensure all pages are processed according to the identified document type, refining the classification process and enhancing accuracy.

Figure 3:
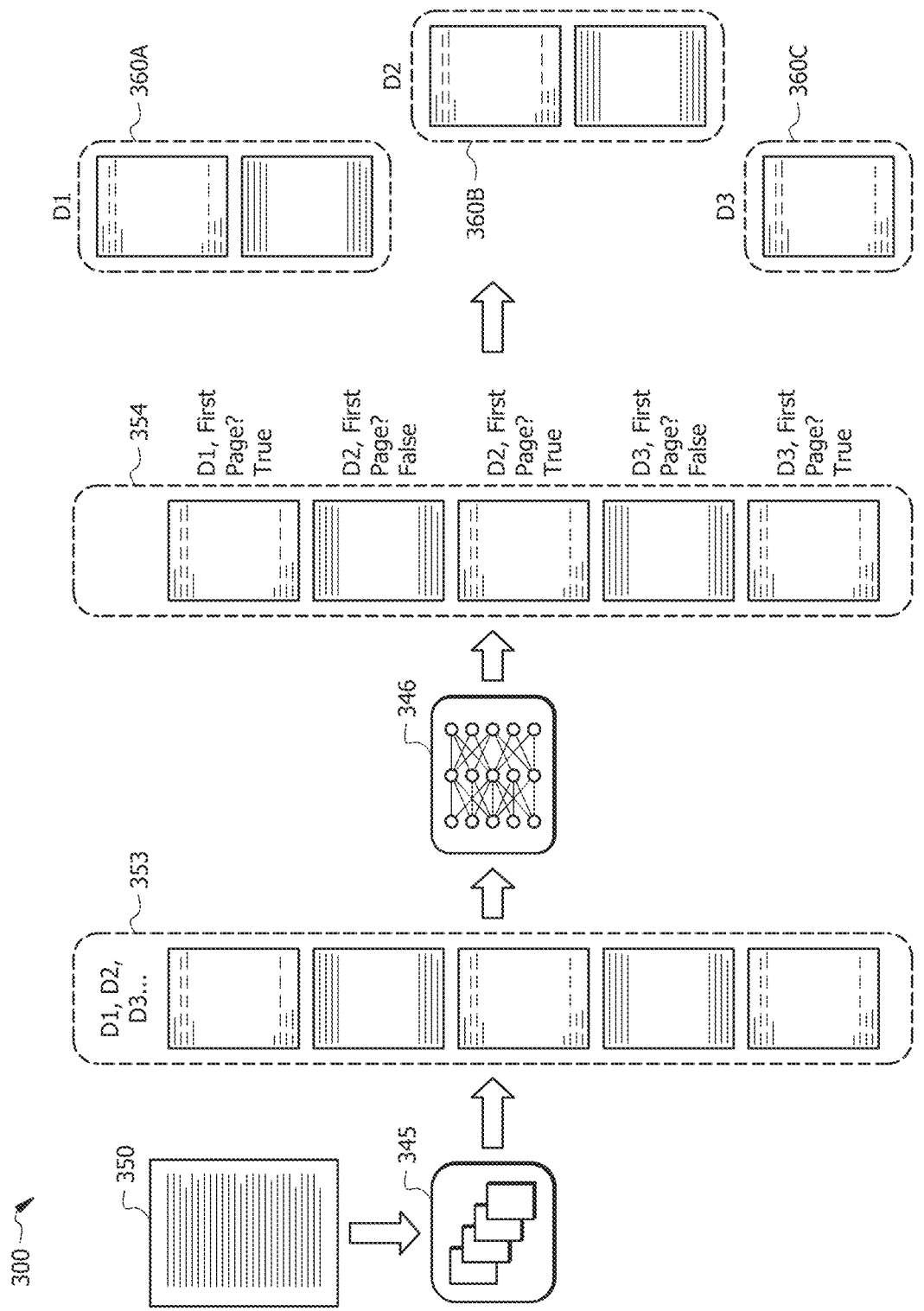
FIG. 3 is a diagram illustrating a conditioning model and a machine-learning classifier for processing documents, according to an embodiment.

FIG. 3 illustrates a process 300 for separating electronic compilation document 350 into individual documents 360A-360C of various types D1-D3 using machine-learning techniques. The process 300 begins by processing electronic compilation document 350, which contains multiple pages of different document types (D1, D2, D3, etc.). Electronic compilation document 350 is processed in stages to classify pages by document type and identify the first page of each document.

Electronic compilation document 350 is initially processed by a conditioning model 345, which is designed to identify the document type for each page within electronic compilation document 350, and generate an intermediate document that can be classified by machine-learning classifier 346. Conditioning model 345 can assign a specified degree of confidence to each document type classification, referred to as the document type confidence. Accordingly, both the document type and its associated confidence level are recorded for each page.

In some embodiments, conditioning model 345 not only classifies each page by type but also applies OCR to extract text from the document before classification. In some cases, the OCR algorithm provides not only the recognized characters but also an OCR confidence score, indicating the reliability of the text recognition. If the document type confidence falls below a predefined OCR threshold, and if it is determined that certain OCR low-confidence scores may be affecting document type accuracy, an alternative (and potentially more advanced or costly) OCR algorithm can be used to improve OCR confidence score. Enhancing OCR accuracy in this way can, in turn, increase the document type confidence to meet the required threshold, ensuring reliable classification.

After the pages of electronic compilation document 350 are classified by document type (e.g., types D1, D2, D3, etc.), conditioning model 345 can further refine the document by selectively retaining specific portions of each page for additional classification by classifier 346. As illustrated in FIG. 3, this conditioning action may involve extracting a defined number of lines from the top and bottom of each page in electronic compilation document 350, resulting in an intermediate document 353. This focused preprocessing step ensures that only the most relevant content from each page is preserved, thereby streamlining the next classification phase by concentrating on some sections. It should be noted that any other suitable preprocessing actions may be applied, as discussed above.

Intermediate document 353 is then further processed by machine-learning classifier 346, which is configured to analyze each page and determine whether it is the first page, last page, or an intermediate page within its respective document. For example, as shown in FIG. 3, machine-learning classifier 346 identifies that the first page of document 360A of type D1 is indeed the start of that document (indicated as "True" for "First Page"), while subsequent pages are marked as "False" if they are not the first pages. Identifying the last and intermediate pages may be optional, as these can be inferred based on the position of each first page. For instance, once the first page of document type D2 is identified, the page immediately preceding it can be designated as the last page of document type D1, and pages between the first and last pages of D1 are classified as intermediate pages. Thus, identifying the first page of each document type ensures that each document segment is correctly identified.

After classification, each identified document type (D1, D2, D3, etc.) and their corresponding first pages are organized as shown in intermediate document 354, which can then be reassembled into separate documents, represented by 360A, 360B, and 360C. It should be noted that separating documents 360A-360C into individual files is optional; in some cases, these documents may be stored as a single intermediate document 354, with each page labeled by document type and page position (e.g., indicating whether the page is a first, intermediate, or last page). This labeling approach allows flexibility in document storage while retaining clear identification of each document segment.

Documents 350, 353, and 354 can be suitable for training machine-learning classifier 346 and/or conditioning model 345. For instance, if electronic compilation document 350 contains information on document types, it can be used to train conditioning model 345 when this model is a machine-learning model. Similarly, if document 350 includes information on both document type and page position, it can be utilized to train machine-learning classifier 346.

Figure 4:
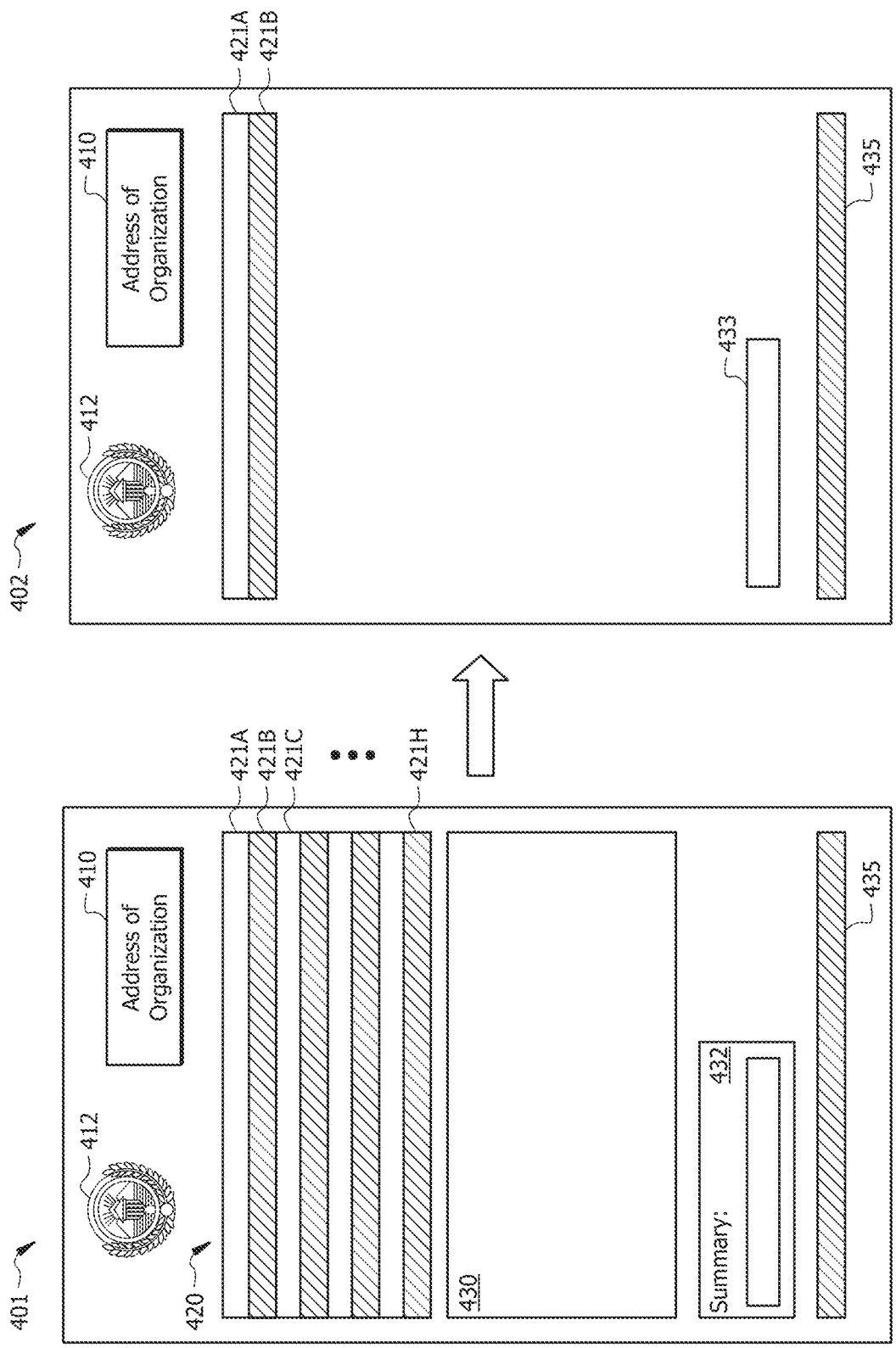
FIG. 4 shows an illustrative document processing, according to an embodiment.

FIG. 4 illustrates an example processing action that can be applied to pages of an electronic compilation document to create intermediate document pages for subsequent classification by a machine-learning classifier, such as classifier 346. FIG. 4 shows an original an address block 410, a table 420 with multiple rows (421A, 421B, 421C-421H), and a section 430, which may contain content relevant to the document's purpose, such as transaction details, narrative information, or descriptive data. Additionally, page 401 includes a summary section 432 and a shaded block 435, potentially indicating another organizational logo or brand identifier.

After applying a processing action, only selected parts of the original page 401 are retained in the processed document 402, resulting in a streamlined layout. In this processed version, unnecessary or redundant elements are removed to focus on essential content. The retained sections in processed document 402 include logo 412, address block 410, a few rows from table 420 (such as 421A and 421B), the first sentence 433 from summary section 432, and the shaded block 435. By preserving some identifiers while omitting superfluous details, processed document 402 serves as an intermediate document for classification.

Figure 5:
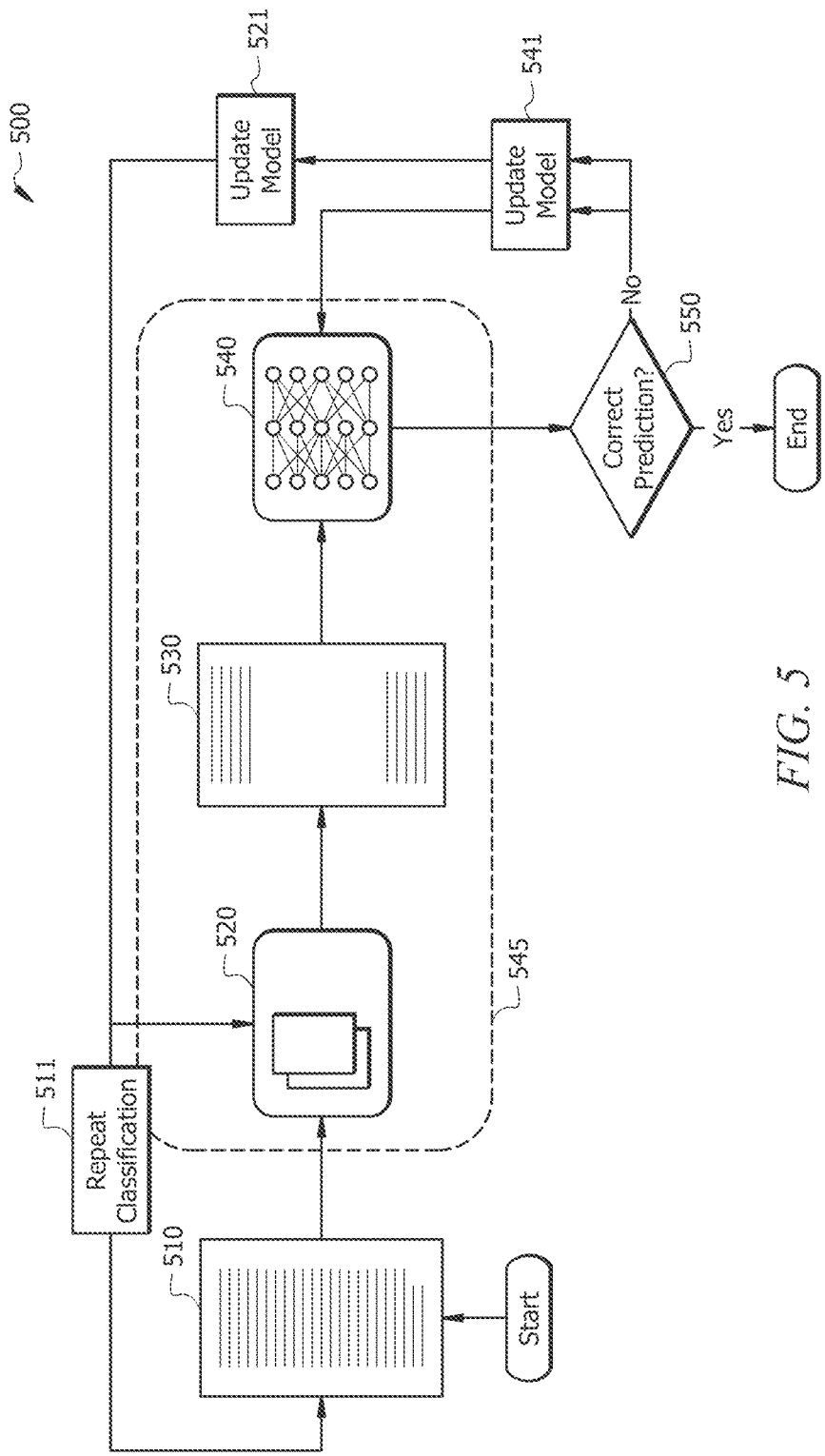
FIG. 5 is a diagram illustrating the training of a conditioning machine-learning model and a machine-learning classifier, according to an embodiment.

FIG. 5 illustrates an example training process 500 for processing an electronic compilation document 510 through a sequence of steps involving the creation of an intermediate document 530 by a conditioning model 520, followed by classification through a machine-learning classifier 540. Conditioning model 520 and machine-learning classifier 540 can be combined to form an integrated model 545. In some cases, machine-learning classifier 540 can function both as a preprocessing model and as a machine-learning classifier based on a prompt provided to machine-learning classifier 540. In some cases, training process 500 can be executed by a training module 143 (as shown in FIG. 1) or by an external training system separate from computing system 105.

Conditioning model 520 is configured to identify the document type for each page of the electronic compilation document 510 and selectively retain relevant content. Machine-learning classifier 540 is then responsible for accurately predicting page positions (e.g., first, last, or intermediate) and, in some cases, confirming the document types identified by conditioning model 520. Training process 500 is designed to allow continuous improvement of integrated model 545 by updating the models based on the accuracy of their predictions. This feedback loop refines the performance of both conditioning model 520 and machine-learning classifier 540, ensuring that they work together effectively for accurate document classification and page positioning.

In an example embodiment, training process 500 starts with processing electronic compilation document 510, which contains various pages with diverse elements and types. The electronic compilation document 510 is part of a training data and can include labeled pages with labels corresponding to a document type for a page and position of the page (e.g., whether the page is a first page of a document).

Electronic compilation document 510 is first passed through conditioning model 520, which analyzes pages of electronic compilation document 510 and selects elements within those pages to retain or remove. The elements can include lines, sections, subsections, boxes, images, or any suitable grouping of text. In an example embodiment, conditioning model 520 can be a machine-learning model, which, in some cases, can be based on a neural network with adjustable weights. The model takes electronic compilation document 510 as an input and by inference, generates an intermediate document 530 containing some parts of electronic compilation document 510 while removing other parts of electronic compilation document 510. Intermediate document 530 is a simplified version of the original electronic compilation document 510, with extraneous content removed, allowing for more efficient and focused classification. For instance, in some implementations, a few top lines and a few bottom lines of electronic compilation document 510 can be retained, while other elements of electronic compilation document 510 can be removed.

In some implementations, conditioning model 520 can be configured to segment the document into distinct sections or elements and assign a weighting to each, determining their retention based on relevance to classification characterized by the assigned weight. For example, if a weight is larger than 0.5, the element may be retained, and if the weight is less than or equal to 0.5, the element may be discarded. Thus, conditioning model 520 can identify specific elements within a page of the electronic compilation document 530 and assign weights to each element. Based on these weights, the model selects only those elements with weights exceeding a specified threshold (e.g., 0.5, 0.6, 0.7, or another appropriate value).

The intermediate document 530 is then processed by machine-learning classifier 540, which is configured to predict each page's position (e.g., first, last, or intermediate page) and confirm its document type. Machine-learning classifier 540 analyzes each page, making predictions about its page position and document type, which are then compared to the expected results based on labeled data at decision node 550. If the prediction matches the expected outcome (operation 550, "Yes"), the training process for that specific dataset, represented by electronic compilation document 510, is complete. If there is a discrepancy (operation 550, "No"), an update process is triggered, where conditioning model 520 and/or machine-learning classifier 540 are updated at operations 521 and 541.

When predictions from machine-learning classifier 540 do not match expected results, both conditioning model 520 and machine-learning classifier 540 become eligible for updates. This update process (with update operations 521 and 541 corresponding to updates for models 520 and 540, respectively) involves adjusting the weights of the neural networks in each model 520 and 540 through backpropagation. This adjustment uses an error function that calculates the difference between the predicted and actual results, refining each model's accuracy over time. In some implementations, a weighting mechanism is applied to prioritize which model-conditioning model 520 or machine-learning classifier 540—should receive more focus during training, depending on the nature of the error.

For example, if the error is attributed to element selection (which can be determined by running a sensitivity analysis on element selection), conditioning model 520 may be prioritized for updates. Sensitivity analysis evaluates how each selected element, such as headers, footers, or tables, influences classification accuracy. If certain elements are found to have a significant impact on errors, the preprocessing model can be adjusted to better retain or filter these elements, enhancing the accuracy of machine-learning classifier 540.

Alternatively, machine-learning classifier 540 may receive more focus if classification issues are more prominent. In other cases, both conditioning model 520 and machine-learning classifier 540 may be equally prioritized for updates, ensuring balanced improvement across both models.

After updates (e.g., adjustments in model parameters) are applied via operations 521 and 541, the document is reprocessed through the updated models in a loop via operation 511. This iterative process can continue until predictions match expected results, ensuring that both models perform well for a desired degree of accuracy.

As shown in FIG. 5, training process 500 is a dynamic, iterative process that continually refines both conditioning model 520 and machine-learning classifier 540. By selectively retaining relevant document elements and accurately classifying page positions and document types, the system enhances its performance over time through model updates. When the models are represented by neural networks, these updates are achieved via backpropagation, allowing the system to learn from errors and progressively improve accuracy.

Figure 6:
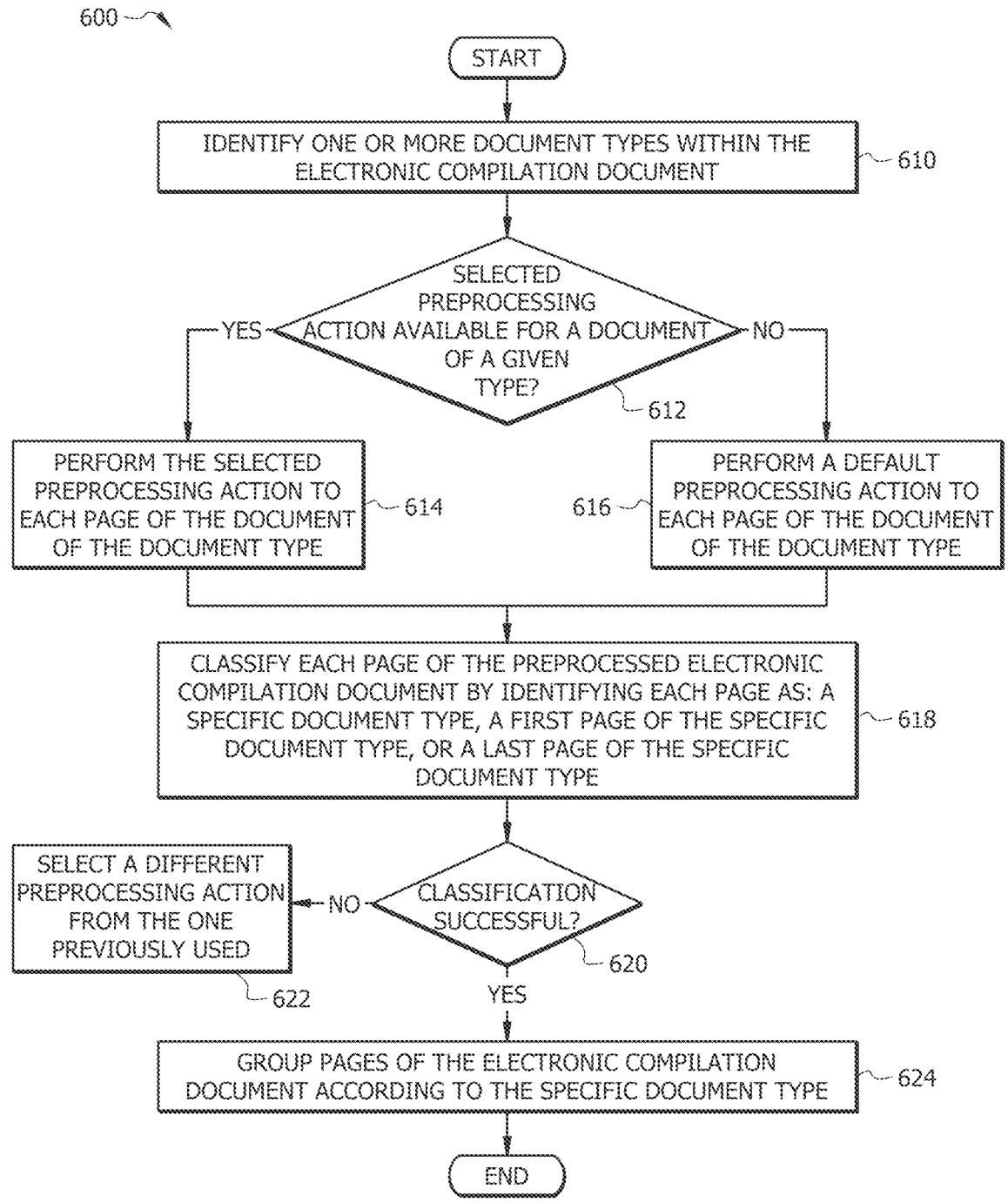
FIG. 6 is a diagram of a method of processing documents, according to an embodiment.

FIG. 6 presents an example flowchart of a method 600 for classifying pages within an electronic compilation document containing multiple pages using a conditioning model, such as conditioning model 141, and a machine-learning classifier 142, as depicted in FIG. 1. It should be noted that both conditioning model 141 and machine-learning classifier 142 are components of the operational instructions 140 and may be implemented through various forms of instructions, including software code, scripts, code libraries, functions, and the like. Thus, operations of method 600 are performed by processor 110 of computing system 105 using operational instructions 140, as shown in FIG. 1.

Method 600 starts at operation 610 by identifying one or more document types within the electronic compilation document. At this operation, processor 110, using operational instructions 140 analyzes the content and features of each page of the electronic compilation document to assign an initial document type classification. In some embodiments, operational instructions 140 can include a first machine-learning classifier trained to identify a document type for a page of the document. The first machine-learning classifier can be part of conditioning model 141, as shown in FIG. 1. In some cases, the first machine-learning classifier can determine the document type by semantic analysis using a large language machine-learning model (LLM). Additionally, or alternatively, the first machine-learning classifier can be trained on training data comprising pages, each labeled by a corresponding document type.

In the training phase of the first machine-learning classifier, the classifier is trained on a labeled dataset comprising pages with pre-assigned document types. During training, the first machine-learning classifier learns to identify document types through supervised learning, where each page's label guides the classifier to associate particular content features (e.g., keywords, layout structures, and patterns) with specific types. The classifier adjusts weights (e.g., via a backpropagation) within its neural network based on errors between predicted and actual labels, gradually refining its accuracy. The training dataset can include document pages representing a variety of document types, ensuring the model generalizes well to diverse inputs.

The first machine-learning classifier may leverage a large language model (LLM) to analyze context for each document type, learning to differentiate between types by identifying unique semantic and syntactic patterns associated with each. Additionally, the classifier can utilize transfer learning, using a suitable LLM foundation model that is further fine-tuned specifically for document classification. This approach enhances the classifier's accuracy in distinguishing among various document types.

Method 600 then advances to operation 612. At operation 612, the system determines whether a selected preprocessing action is available for a document of a given type. If a specific preprocessing action is identified based on historical performance data or document type configuration, the method proceeds to operation 614.

As previously described, a preprocessing action refers to a transformation or filtering applied to pages of the electronic compilation document to prepare them for classification. These actions are designed to remove irrelevant data (noise) and focus on key content that aids in accurately identifying the document type and page boundaries.

Historical performance data refers to metrics collected from prior classification runs, including accuracy, false positives, false negatives, and processing efficiency. Based on these metrics, the system selects a preprocessing action that historically performs best for the given document type. Alternatively, certain document types may have predefined configurations specifying appropriate preprocessing actions. For example, legal documents might benefit from extracting headers and footers, while product manuals might require extracting top and bottom lines to capture key context.

For example, legal documents may have historical performance data showing that extracting only headers, footers, and the first paragraph from each page results in a classification accuracy of over 95%. The system selects a preprocessing action to extract these sections in such cases. Similarly, business reports might benefit from retaining keywords like "Summary" or "Executive Overview," while product manuals may require extracting each page's top three and bottom three lines.

As previously discussed, determining preprocessing actions can also involve a preprocessing machine-learning model. This model analyzes the structure and content of the document to infer the most suitable preprocessing steps when historical data or predefined configurations are unavailable.

If a specific preprocessing action is identified (operation 612, Yes), method 600 proceeds to operation 614 to perform the action. In particular, system 100 performs the selected preprocessing action to each page of the document of the document type at operation 614. Alternatively, method 600 proceeds to operation 616 where system 100 performs a default preprocessing action if no specific preprocessing action is available, as determined at operation 612.

At operation 614, in response to identifying the document types for the pages of the electronic compilation document, processor 110 performs the selected preprocessing action to each page. This preprocessing action selectively retains only the relevant content, resulting in a preprocessed electronic compilation document (also referred to as an intermediate electronic document). This step prepares each page effectively for further classification. In some embodiments, the selected preprocessing action can be different for documents of different document types.

In an example embodiment, the preprocessing action includes selecting a specified number of top lines from each page of the electronic compilation document, as well as a specified number of bottom lines from each page. These selected top and bottom lines are then combined to create a corresponding preprocessed page in the preprocessed electronic compilation document.

In some cases, for one or more document types identified in operation 610, the preprocessing action can be chosen from a set of template preprocessing actions. This set is determined based on historical performance data that indicates the effectiveness of each template in producing a preprocessed electronic compilation document, where pages are classified by the second machine-learning classifier with an accuracy above a specified threshold.

For example, if historical data shows that extracting only the first three and last three lines of each page results in a sufficiently high classification accuracy for legal documents (e.g., accuracy above 80%, 85%, 90%, 95%, and the like), this template preprocessing action may be selected for those types. Conversely, for business reports, a different template-such as retaining only headers, footers, and specific keywords-might be used if it has been shown to achieve better classification accuracy for those documents.

In some cases, a suitable preprocessing action can be selected for each individual document type. Alternatively, a single preprocessing action may be chosen for a group of related document types. For example, a specific preprocessing action might be applied to a group of documents that includes product descriptions, product manuals, and advertising information, while a different preprocessing action could be used for legal documents and business reports. This approach allows for tailored preprocessing that aligns with the characteristics and requirements of each document type or group.

In some cases, the preprocessing action is determined by a preprocessing machine-learning model, which is a subset of operational instructions 140. In this approach, applying the preprocessing action to each page of the electronic compilation document involves performing an inference using the preprocessing machine-learning model on each page, resulting in a corresponding page within the preprocessed electronic compilation document.

Method 600 then proceeds to operation 618, where each page of the preprocessed electronic compilation document is classified using processor 110. This classification involves identifying the document type of each page and determining whether it is the first page of that type. In some cases, the classification may also include identifying whether the page is the last page or an intermediate page within the document type. The classification process is carried out using operational instructions that include a second machine-learning classifier. Such a classifier can be a machine learning classifier 142, as shown in FIG. 1. This classifier is trained on labeled document data that specifies both the document type and the page position for each page, with the page position indicating whether the page is the first page. The second machine-learning classifier can be trained using a training approach that is similar to training the first machine-learning classifier.

At operation 620, computing system 105 can check whether the classification was successful. Success is determined based at least in part upon whether the classification meets accuracy thresholds as determined by machine learning classifier 142. If the classification is not successful (operation 620, No), method 600 proceeds to operation 622, at which a different preprocessing action can be selected. Subsequently, method 600 proceeds back to apply the newly selected preprocessing action at operation 614. This iterative refinement ensures that the system dynamically adjusts to improve classification performance. In some cases, the different preprocessing action may be selected from the set of template preprocessing actions. Alternatively, the different preprocessing action can be a default preprocessing action, and in some cases, the different preprocessing action can be a combination of several preprocessing actions obtained from the set of template preprocessing actions.

In some embodiments, a Boolean combination of preprocessing actions can be used to create a preprocessing strategy. One such combination is a union of preprocessing actions obtained from the set of template preprocessing actions. The union merges the outputs of two or more preprocessing actions to retain content from all selected actions. For example, extracting the top three lines of each page and all headers and footers could be combined using a union operation to ensure both contextual and structural information are retained.

Another combination is the intersection, which retains only the content common across two or more preprocessing actions. For instance, extracting lines containing numeric values and those with keywords like "Total" or "Amount" can be combined to isolate content critical for financial documents. This operation narrows down the data to the most relevant portions, ensuring that overlapping features are emphasized.

Similarly, a difference operation for preprocessing actions removes specific content identified by one preprocessing action from the output of another. For example, if one action extracts all text lines and another identifies lines containing noise, such as page numbers, the difference operation retains all text except for the noise. This is particularly useful in technical documents where formatting artifacts need to be excluded while keeping the main content intact.

Additionally, or alternatively, a symmetric difference operation for preprocessing actions can be used. Such operation retains content unique to each preprocessing action, excluding overlapping data. For example, if one action extracts bold text and another extracts italic text, the symmetric difference ensures only bold and italic text that do not overlap are retained.

Additionally, conditional logic, such as IF-THEN-ELSE, can be employed to dynamically select preprocessing actions based on document type or detected content. For instance, the system could apply one preprocessing action for legal contracts, such as extracting headers and footers, and another for scientific papers, like isolating section headings and abstracts, with a default action for unrecognized document types.

In more complex scenarios, a nested Boolean logic can combine multiple operations. For example, the system could extract the top three lines and all headers and footers (union) while excluding lines with noise words like "Confidential" or "Draft" (difference).

Once classification is successful (operation 620, Yes), method 600 proceeds to operation 624, where the pages of the electronic compilation document are grouped based on their specific document type. This grouping organizes pages according to their assigned document type, with each group containing all pages from the identified first page to the last page of that document type.

As described above, various steps of method 600 are performed by processor 110 executing operational instructions 140 (processor 110 and operational instructions 140 are shown in FIG. 1). In some cases, operational instructions 140 include multiple models, such as conditioning model 141 and machine-learning classifier 142. Alternatively, a single machine-learning classifier model may be used to perform operations 610-616 of method 600. For example, applying a preprocessing action could be accomplished through an inference of the machine-learning classifier using a first input prompt, while classifying each page of the preprocessed electronic compilation document could be achieved by performing an inference with a second input prompt.

When the first page of a document cannot be easily identified, various methods described herein can adopt a probabilistic approach based on the context of many pages of an electronic compilation document. Such approach can analyze content and structural analysis of the electronic compilation document to determine a starting page for each document type. Sequential dependency analysis can be used to examine the flow of content, such as transitions between sections, keywords, or formatting styles, to identify patterns indicating the beginning of the document. For instance, pages containing introductory terms like "Executive Summary" or "Table of Contents" may suggest the start. Additionally, the system can assign probability scores to pages based on specific features often associated with first pages, such as the presence of a title, logo, introductory text, or metadata. Pages lacking continuation indicators, like "Page 2 of 10," or containing high-level headers can receive higher scores.

If initial attempts to identify the first page are inconclusive, the system can iterate with alternative preprocessing actions or thresholds. For example, it may adjust its criteria for first-page indicators or reassess pages based on features that are less obvious but still relevant, such as the absence of terms like "continued" or repetitive section labels. When automated methods fail, the system can involve human review by presenting the top candidates for confirmation. Feedback from these reviews can then be used to refine the models and improve future identification efforts. By integrating these strategies, the system can address the challenges of identifying first pages in documents with ambiguous layouts or unconventional structures.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A system comprising:
   a memory configured to store an electronic compilation document containing multiple pages and operational instructions; and
   a hardware processor operably coupled to the memory, the hardware processor configured to execute the operational instructions to:
   identify one or more document types within the electronic compilation document using a first machine-learning classifier, the first machine-learning classifier being a first subset of the operational instructions, wherein the first machine-learning classifier is trained on training data comprising pages, each labeled by a corresponding document type;
   in response to identifying the one or more document types, implement a preprocessing action to each page of the electronic compilation document, resulting in a preprocessed electronic compilation document;
   classify each page of the preprocessed electronic compilation document using a second machine-learning classifier, the second machine-learning classifier being a second subset of operational instructions, by identifying each page as:
   a specific document type;
   a first page of the specific document type; and
   a last page of the specific document type;
   wherein the second machine-learning classifier is trained on labeled document data specifying document type and a page position for each page of the labeled document data, the page position indicating whether each page is the first page; and
   group pages of the electronic compilation document according to the specific document type, with each group comprising pages from the first page to the last page of the specific document type.

2. The system of claim 1, wherein the preprocessing action comprises:
   selecting a first specified number of top lines from each page of the electronic compilation document;
   selecting a second specified number of bottom lines from each page of the electronic compilation document; and
   wherein selected top lines and bottom lines from each page are combined to form a corresponding preprocessed page in the preprocessed electronic compilation document.

3. The system of claim 1, wherein, for the one or more document types, the preprocessing action is selected from a set of template preprocessing actions, the set being determined based on historical performance data indicating effectiveness of each template preprocessing action from the set of template preprocessing actions in producing the preprocessed electronic compilation document in which pages are classified by the second machine-learning classifier for the one or more document types with an accuracy above an accuracy threshold.

4. The system of claim 1, wherein for each document type from the one or more document types, the preprocessing action is selected from a set of template preprocessing actions based on historical performance data indicating effectiveness of each template preprocessing action from the set in producing the preprocessed electronic compilation document in which pages can be classified by the second machine-learning classifier with an accuracy above an accuracy threshold.

5. The system of claim 1, wherein the preprocessing action is implemented using a preprocessing machine-learning model, the preprocessing machine-learning model comprising a third subset of the operational instructions, wherein the implementation of the preprocessing action to each page of the electronic compilation document comprises performing an inference using the preprocessing machine-learning model on each page, resulting in a corresponding page of the preprocessed electronic compilation document.

6. The system of claim 5, wherein the preprocessing machine-learning model and the second machine-learning classifier each comprise neural network models with associated weights, the training of the preprocessing machine-learning model and the second machine-learning classifier comprising performing backpropagation to adjust the associated weights, thereby reducing an error between a predicted classification for each page of the electronic compilation document and labeled data indicating a classification for each page, the classification for each page comprising identification of the document type and whether each page is the first page.

7. The system of claim 5, wherein implementing the preprocessing action is performed by the second machine-learning classifier having as an input a first prompt, and wherein the classifying of each page of the preprocessed electronic compilation document is determined by the second machine-learning classifier having as the input a second prompt.

8. A method comprising:
identifying one or more document types within an electronic compilation document using a first machine-learning classifier, the first machine-learning classifier being a first subset of operational instructions, wherein the first machine-learning classifier is trained on training data comprising pages, each labeled by a corresponding document type;
in response to identifying the one or more document types, implementing a preprocessing action to each page of the electronic compilation document, resulting in a preprocessed electronic compilation document;
classifying each page of the preprocessed electronic compilation document using a second machine-learning classifier, the second machine-learning classifier being a second subset of operational instructions, by identifying each page as:
a specific document type;
a first page of the specific document type; and
a last page of the specific document type;
wherein the second machine-learning classifier is trained on labeled document data specifying document type and a page position for each page of the labeled document data, the page position indicating whether each page is the first page; and
grouping pages of the electronic compilation document according to the specific document type, with each group comprising pages from the first page to the last page of the specific document type.

9. The method of claim 8, wherein the preprocessing action comprises:
selecting a first specified number of top lines from each page of the electronic compilation document;
selecting a second specified number of bottom lines from each page of the electronic compilation document; and
wherein selected top lines and bottom lines from each page are combined to form a corresponding preprocessed page in the preprocessed electronic compilation document.

10. The method of claim 8, wherein, for the one or more document types, the preprocessing action is selected from a set of template preprocessing actions, the set being determined based on historical performance data indicating effectiveness of each template preprocessing action from the set of template preprocessing actions in producing the preprocessed electronic compilation document in which pages are classified by the second machine-learning classifier for the one or more document types with an accuracy above an accuracy threshold.

11. The method of claim 8, wherein for each document type from the one or more document types, the preprocessing action is selected from a set of template preprocessing actions based on historical performance data indicating effectiveness of each template preprocessing action from the set in producing the preprocessed electronic compilation document in which pages can be classified by the second machine-learning classifier with an accuracy above an accuracy threshold.

12. The method of claim 8, wherein the preprocessing action is implemented using a preprocessing machine-learning model, the preprocessing machine-learning model comprising a third subset of the operational instructions, wherein the implementation of the preprocessing action to each page of the electronic compilation document comprises performing an inference using the preprocessing machine-learning model on each page, resulting in a corresponding page of the preprocessed electronic compilation document.

13. The method of claim 12, wherein the preprocessing machine-learning model and the second machine-learning classifier each comprise neural network models with associated weights, the training of the preprocessing machine-learning model and the second machine-learning classifier comprising performing backpropagation to adjust the associated weights, thereby reducing an error between a predicted classification for each page of the electronic compilation document and labeled data indicating a classification for each page, the classification for each page comprising identification of the document type and whether each page is the first page.

14. The method of claim 12, wherein implementing the preprocessing action is performed by the second machine-learning classifier having as an input a first prompt, and wherein the classifying of each page of the preprocessed electronic compilation document is determined by the second machine-learning classifier having as the input a second prompt.

15. A non-transitory computer-readable medium storing instructions that, when executed by a processor, cause the processor to:
identify one or more document types within electronic compilation document using a first machine-learning classifier, the first machine-learning classifier being a first subset of operational instructions, wherein the first machine-learning classifier is trained on training data comprising pages, each labeled by a corresponding document type;

in response to identifying the one or more document types, implement a preprocessing action to each page of the electronic compilation document, resulting in a preprocessed electronic compilation document;

classify each page of the preprocessed electronic compilation document using a second machine-learning classifier, the second machine-learning classifier being a second subset of operational instructions, by identifying each page as:
- a specific document type;
- a first page of the specific document type; and
- a last page of the specific document type;

wherein the second machine-learning classifier is trained on labeled document data specifying document type and a page position for each page of the labeled document data, the page position indicating whether each page is the first page; and group pages of the electronic compilation document according to the specific document type, with each group comprising pages from the first page to the last page of the specific document type.

16. The non-transitory computer-readable medium of claim 15, wherein the preprocessing action comprises:
selecting a first specified number of top lines from each page of the electronic compilation document;
selecting a second specified number of bottom lines from each page of the electronic compilation document; and
wherein selected top lines and bottom lines from each page are combined to form a corresponding preprocessed page in the preprocessed electronic compilation document.

17. The non-transitory computer-readable medium of claim 15, wherein, for the one or more document types, the preprocessing action is selected from a set of template preprocessing actions, the set being determined based on historical performance data indicating effectiveness of each template preprocessing action from the set of template preprocessing actions in producing the preprocessed electronic compilation document in which pages are classified by the second machine-learning classifier for the one or more document types with an accuracy above an accuracy threshold.

18. The non-transitory computer-readable medium of claim 15, wherein for each document type from the one or more document types, the preprocessing action is selected from a set of template preprocessing actions based on historical performance data indicating effectiveness of each template preprocessing action from the set in producing the preprocessed electronic compilation document in which pages can be classified by the second machine-learning classifier with an accuracy above an accuracy threshold.

19. The non-transitory computer-readable medium of claim 15, wherein the preprocessing action is implemented using a preprocessing machine-learning model, the preprocessing machine-learning model comprising a third subset of the operational instructions, wherein the implementation of the preprocessing action to each page of the electronic compilation document comprises performing an inference using the preprocessing machine-learning model on each page, resulting in a corresponding page of the preprocessed electronic compilation document.

20. The non-transitory computer-readable medium of claim 19, wherein the preprocessing machine-learning model and the second machine-learning classifier each comprise neural network models with associated weights, the training of the preprocessing machine-learning model and the second machine-learning classifier comprising performing backpropagation to adjust the associated weights, thereby reducing an error between a predicted classification for each page of the electronic compilation document and labeled data indicating a classification for each page, the classification for each page comprising identification of the document type and whether each page is the first page.

\* \* \* \* \*